United States Patent
Park

[11] Patent Number: 5,675,634
[45] Date of Patent: Oct. 7, 1997

[54] ANNOUNCEMENT APPARATUS FOR SWITCHING SYSTEM

[75] Inventor: Dong-won Park, Kyunegi-do, Rep. of Korea

[73] Assignee: LG Information & Communications, Ltd., Seoul, Rep. of Korea

[21] Appl. No.: 556,886

[22] Filed: Nov. 2, 1995

[30] Foreign Application Priority Data

Nov. 7, 1994 [KR] Rep. of Korea ............ 94-29076

[51] Int. Cl.⁶ ................................................ H04M 1/64
[52] U.S. Cl. .......................... 379/88; 370/525; 379/242
[58] Field of Search ........................... 379/67, 88, 89, 379/242; 370/525, 522

[56] References Cited

U.S. PATENT DOCUMENTS

| | | | |
|---|---|---|---|
| 4,979,171 | 12/1990 | Ashley | 370/525 |
| 5,127,004 | 6/1992 | Lenihan et al. | 370/525 |
| 5,416,830 | 5/1995 | MacMillan, Jr. et al. | 379/88 |

Primary Examiner—Fan Tsang
Attorney, Agent, or Firm—Keck, Mahin & Cate

[57] ABSTRACT

An announcement apparatus for a switching system, comprising a host processor for controlling the output of announcement voices with respect to the total voice service channels, a DPRAM for storing voice output address data therein, a CPU responsive to an interrupt signal, for storing the voice output address data into the DPRAM and outputting voice output state data, a common memory for transferring voice output command data from the host processor to the CPU and transferring the voice output state data from the CPU to the host processor, a fixed voice memory for storing fixed announcement voice data therein, an edited voice memory for storing edited announcement voice data therein, and a memory controlling/voice processing circuit for outputting the interrupt signal to the CPU, reading the voice output address data from the DPRAM, outputting the read voice output address data to the fixed voice memory or the edited voice memory, converting parallel announcement voice data from the fixed voice memory or the edited voice memory into serial data and transferring the converted serial data to a time switch of the switching system through a sub-highway.

8 Claims, 2 Drawing Sheets

5,675,634

ANNOUNCEMENT APPARATUS FOR SWITCHING SYSTEM

BACKGROUND OF THE INVENTION

1. Field of the Invention

The present invention relates in general to announcement apparatus for switching systems, and more particularly to an announcement apparatus for a switching system which is capable of increasing the usefulness of voice service channels.

2. Description of the Prior Art

Generally, a switching system comprises an announcement apparatus for outputting an announcement voice to a calling party when a call is requested by the caller. The announcement voice informs the calling party of a state of the party being called or of difficulties in connecting the call.

Referring to FIG. 1, there is shown a block diagram of a conventional announcement apparatus for a switching system. As shown in this drawing, the conventional announcement apparatus comprises a host processor 10, a fixed voice processor 11 and an edited voice processor 12. The fixed voice processor 11 acts to output a fixed announcement voice in response to a command from the host processor 10 to inform a calling party of a line fault status of call connection. The edited voice processor 12 acts to output an edited announcement voice in response to a command from the host processor 10 to provide the calling party with a special service such as change-of-number information, call incoming refusal information, in-absence information and etc.. The edited voice processor 12 outputs the edited announcement voice to a time switch of the switching system through sub-highways SHW0 and SHW1. The fixed voice processor 11 outputs the fixed announcement voice to the time switch of the switching system through sub-highways SHW3 and SHW4. The fixed and edited voice processors 11 and 12 can output the corresponding announcement voices only within the maximum voice service channel ranges assigned thereto. For this reason, in the case where the fixed and edited voice processors 11 and 12 are required to output the corresponding announcement voices beyond their maximum voice service channel ranges, they must wait until the present voice output channels are changed to idle states. Thereafter, when idle channels are present, the fixed and edited voice processors 11 and 12 output the corresponding announcement voices through the idle channels. The calling party is provided with a music broadcast while waiting for the fixed and edited voice processors 11 and 12 to output the corresponding announcement voices.

In the conventional announcement apparatus for the switching system, as mentioned above, the fixed and edited voice processors 11 and 12 can output the corresponding announcement voices only within the maximum voice service channel ranges assigned thereto. For example, assume that, now, some of voice service channels assigned to the fixed voice processor 11 are in an idle state and voice service channels assigned to the edited voice processor 12 are all outputting their announcement voices to provide the voice service. Upon receiving a voice output command from the host processor 10, the edited voice processor 12 must wait until at least one of its voice service channels is changed to the idle state, and thereafter output the corresponding announcement voice through the voice service channel changed to the idle state, although the idle channels are present in the fixed voice processor 11. In this connection, the conventional announcement apparatus for the switching system has the disadvantage that the voice service channels are not very useful.

SUMMARY OF THE INVENTION

Therefore, the present invention has been made in view of the above problem, and it is an object of the present invention to provide an announcement apparatus for a switching system which is capable of increasing the usefulness of voice service channels.

In accordance with the present invention, the above and other objects can be accomplished by a provision of an announcement apparatus for a switching system, comprising first control means for controlling the output of announcement voices with respect to the total voice service channels; first storage means for storing voice output address data therein, the voice output address data corresponding to voice output command data from the first control means; second control means responsive to an interrupt signal, for storing the voice output address data corresponding to the voice output command data from the first control means into the first storage means and outputting voice output state data; second storage means for transferring the voice output command data from the first control means to the second control means and transferring the voice output state data from the second control means to the first control means; fixed voice storage means for storing fixed announcement voice data therein and in parallel outputting one of the fixed announcement voice data stored in its location corresponding to the voice output address data from the first storage means; edited voice storage means for storing edited announcement voice data therein and in parallel outputting one of the edited announcement voice data stored in its location corresponding to the voice output address data from the first storage means; and memory controlling/voice processing means for outputting the interrupt signal to the second control means, reading the voice output address data from the first storage means, outputting the read voice output address data to the fixed voice storage means or the edited voice storage means, converting the parallel announcement voice data from the fixed voice storage means or the edited voice storage means into serial data and transferring the converted serial data to switching means of the switching system through a sub-highway.

The voice output command data which is transferred from the first control means to the second control means by the second storage means includes an output command identification flag and a message identification flag. The voice output state data which is transferred from the second control means to the first control means by the second storage means includes an output state identification flag.

The second storage means includes a first storage area for storing the output command identification flag therein; a second storage area for storing the message identification flag therein; and a third storage area for storing the output state identification flag therein. The memory controlling/voice processing means outputs the interrupt signal to the second control means every a predetermined time.

The second control means, in response to the interrupt signal from the memory controlling/voice processing means, periodically repeats the operation of reading the voice output command data from the second storage means, storing the voice output address data corresponding to the read voice output command data into the first storage means and storing the voice output state data into the second storage means.

The memory controlling/voice processing means periodically repeats the operation of reading the voice output address data from the first storage means, outputting the read voice output address data to the fixed voice storage means or the edited voice storage means, converting the parallel announcement voice data from the fixed voice storage means or the edited voice storage means into the serial data and transferring the converted serial data to the switching means of the switching system through the sub-highway. The first storage means has such an addressing structure that the second control means and the memory controlling/voice processing means cannot simultaneously access the same location thereof.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
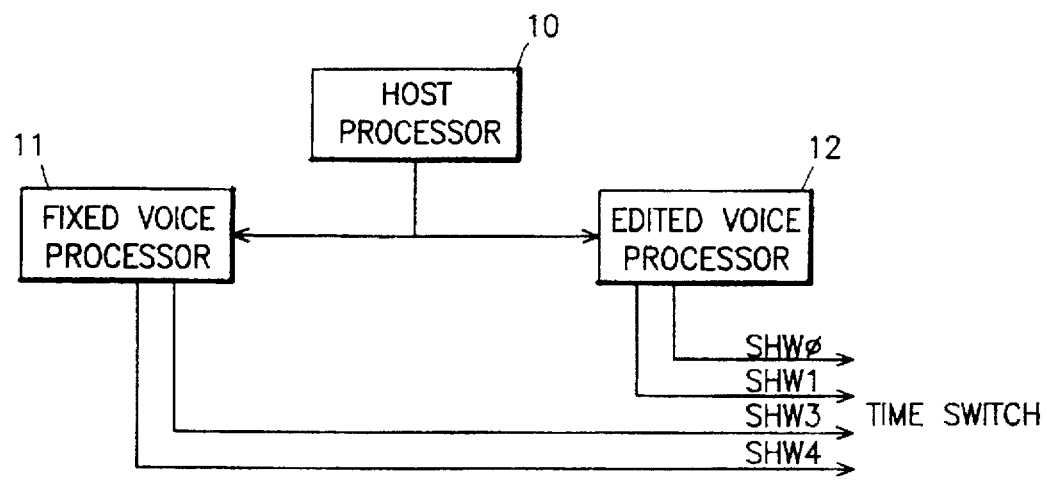
FIG. 1 is a block diagram of a conventional announcement apparatus for a switching system.
Figure 2:
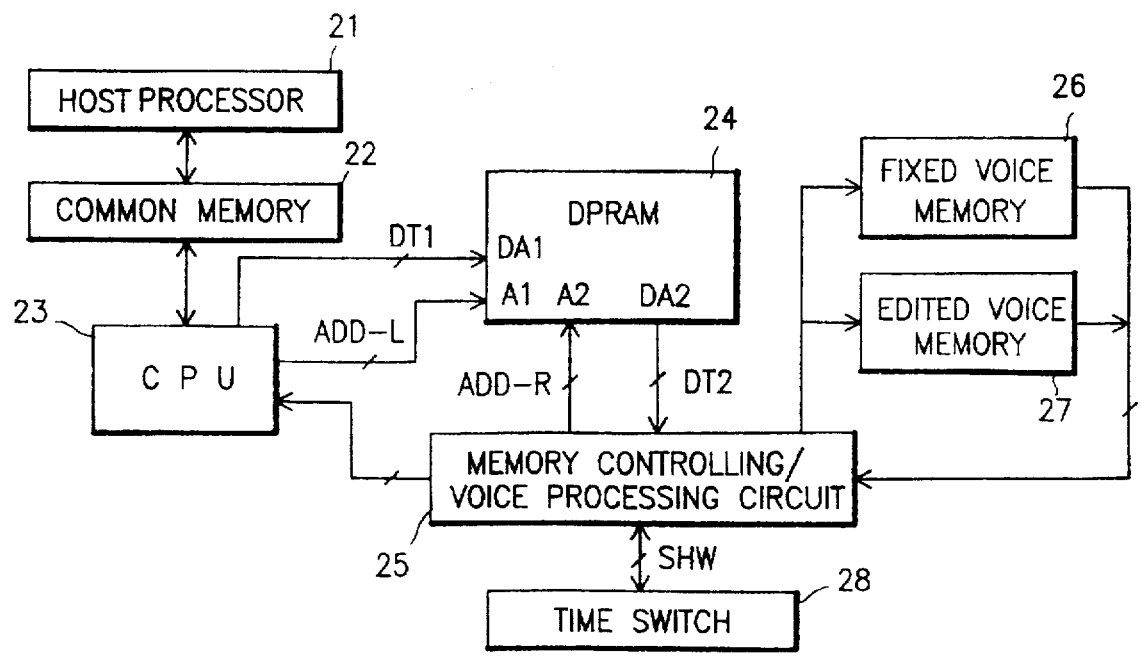
FIG. 2 is a block diagram of an announcement apparatus for a switching system in accordance with the present invention.

Referring to FIG. 2, there is shown a block diagram of an announcement apparatus for a switching system in accordance with the present invention. As shown in this drawing, the announcement apparatus comprises a host processor 21, a common memory 22, a central processing unit (referred to hereinafter as CPU) 23, a dual port random access memory (referred to hereinafter as DPRAM) 24, a memory controlling/voice processing circuit 25, a fixed voice memory 26, and an edited voice memory 27. The host processor 21 outputs announcement voice output command data to the common memory 22 and receives announcement voice output state data from the common memory 22. The common memory 22 transfers the announcement voice output command data from the host processor 21 to the CPU 23. The common memory 22 also transfers the announcement voice output state data from the CPU 23 to the host processor 21. The CPU 23 writes voice output address data into the DPRAM 24 in response to an interrupt signal from the memory controlling/voice processing circuit 25. The voice output address data corresponds to the announcement voice output command data from the common memory 22. The CPU 23 also writes the announcement voice output state data into the common memory 22. The memory controlling/voice processing circuit 25 periodically outputs the interrupt signal to the CPU 23. The memory controlling/voice processing circuit 25 also reads the voice output address data from the DPRAM 24 and outputs the read voice output address data to the fixed voice memory 26 or the edited voice memory 27. The memory controlling/voice processing circuit 25 further converts parallel announcement voice data from the fixed voice memory 26 or the edited voice memory 27 into serial data and transfers the converted serial data to a time switch 28 of the switching system through a sub-highway SHW.

Figure 3:
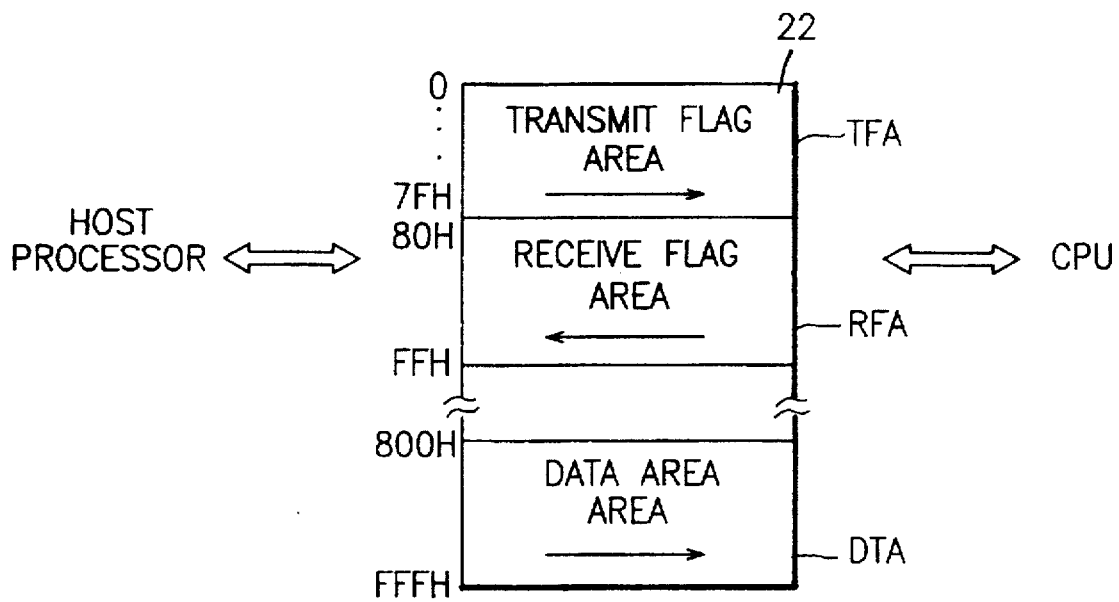
FIG. 3 is a view illustrating an example of using a common memory in FIG. 2.

The host processor 21 and the CPU 23 transmit and receive the announcement voice output command data and the announcement voice output state data and vice versa through the common memory 22. The announcement voice output command data which is transmitted from the host processor 21 to the CPU 23 includes an output command identification flag (see the below table 1) and a message identification flag (see the below table 2). The announcement voice output state data which is transmitted from the CPU 23 to the host processor 21 includes an output state identification flag (see the table 1). To input and output the above data, the common memory 22 is provided with a transmit flag area TFA, a receive flag area RFA and a data area DTA as shown in FIG. 3. The output command identification flag from the host processor 21 is written in the transmit flag area TFA of the common memory 22. The output state identification flag from the CPU 23 is written in the receive flag area RFA of the common memory 22. The message identification flag from the host processor 21 is written in the data area DTA of the common memory 22. The output command identification flag written in the transmit flag area TFA is allocated with 1 byte for each voice service channel. The output state identification flag written in the receive flag area RFA is allocated with 1 byte for each voice service channel. The message identification flag written in the data area DTA is allocated with 16 bytes for each voice service channel.

The following table 1 shows the output command identification flag from the host processor 21 and the output state identification flag from the CPU 23 and the following table 2 shows the message identification flag from the host processor 21. In the table 1, the fixed message is a message which is outputted in a fixed form, and the self-number information, change-of-number information, call incoming refusal information and in-absence information are edited messages which are outputted in different forms.

TABLE I

| | OUTPUT COMMAND IDENTIFICATION | OUTPUT STATE IDENTIFICATION FLAG | |
| --- | --- | --- | --- |
| | FLAG CONNECTION COMMAND | IN-CONNEC-TION | CONNEC-TION END |
| FIXED MESSAGE | 11H | 12H | 14H |
| SELF-NUMBER INFORMATION | 21H | 22H | 24H |
| CHANGE-OF-NUMBER INFORMATION | 41H | 42H | 44H |
| CALL INCOMING REFUSAL INFORMATION | 81H | 82H | 84H |
| IN-ABSENCE INFORMATION | A1H | 42H | A4H |

TABLE II

| FIXED MESSAGE | EDITED MESSAGE |
| --- | --- |
| MESSAGE 0: 01H | Zero: 0 |
| MESSAGE 1: 02H | One: 1 |
| . | . . |
| . | . . |
| . | The number you are dialing: 1 |
| MESSAGE 32: 1EH | . . |

First, the host processor 21 writes an output command identification flag into the transmit flag area TFA of the common memory 22, which instructs a message to be outputted. The host processor 21 also writes a message identification flag into the data area DTA of the common memory 22, which corresponds to the message to be outputted. The CPU 23 reads the output command identification flag and message identification flag from the transmit flag area TFA and data area DTA of the common memory 22, respectively. Then, the CPU 23 outputs voice output address data corresponding to the read message identification flag to a data port DA1 of the DPRAM 24 through a data line DT1. The CPU 23 also applies an address to an address port A1 of the DPRAM 24 through an address line ADD-L. As a result, the voice output address data from the CPU 23 is stored in a location of the DPRAM 24 corresponding to the address applied from the CPU 23. The CPU 23 then writes an output state identification flag into the receive flag area RFA of the common memory 22, which indicates that the message is in connection. The voice output address data stored in the DPRAM 24 covers the total voice service channels (preferably, 128 channels). The CPU 23 performs the above operation at a period of 128 msec to store the voice output address data about the total voice service channels into the DPRAM 24. The memory controlling/voice processing circuit 25 applies an address periodically or every 128 msec to an address port A2 of the DPRAM 24 through an address line ADD-R to read voice output address data from a location of the DPRAM 24 corresponding to the applied address. The memory controlling/voice processing circuit 25 receives the read voice output address data from a data port DA2 of the DPRAM 24 through a data line DT2. Then, the memory controlling/voice processing circuit 25 applies the read voice output address data as an address to the fixed voice memory 26 or the edited voice memory 27. The fixed voice memory 26 or the edited voice memory 27 outputs, in parallel, announcement voice data stored in its location corresponding to the address from the memory controlling/voice processing circuit 25. The memory controlling/voice processing circuit 25 converts the parallel announcement voice data from the fixed voice memory 26 or the edited voice memory 27 into serial data and transfers the converted serial data to the time switch 28 of the switching system through the sub-highway SHW. After the voice output operation regarding the total 128 channels for one interrupt period (128 msec) is ended, the memory controlling/voice processing circuit 25 outputs the subsequent interrupt signal to the CPU 23. In response to the subsequent interrupt signal from the memory controlling/voice processing circuit 25, the CPU 23 stores the voice output address data about 128 channels into the DPRAM 24 and writes the output state identification flag for each channel into the receive flag area RFA of the common memory 22. The host processor 21 reads the contents written in the receive flag area RFA of the common memory 22 to recognize the voice output state. Then, the host processor 21 controls the voice output operation in accordance with the recognized voice output state.

Figure 4:
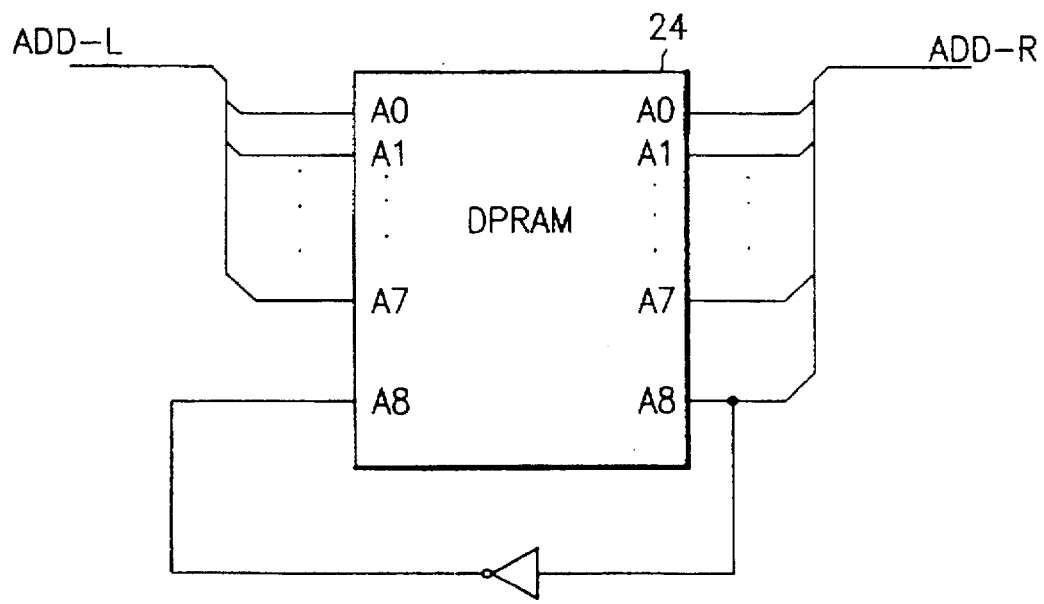
FIG. 4 is a view illustrating an example of using a dual port random access memory in FIG. 2.

The memory controlling/voice processing circuit 25 outputs the interrupt signal to the CPU 23 at a period of 128 msec. The CPU 23 processes the voice output address data regarding the total voice service channels in response to the interrupt signal from the memory controlling/voice processing circuit 25. The CPU 23 also writes the output state identification flag by channels into the receive flag area RFA of the common memory 22. Then, the CPU 23 waits for the subsequent interrupt signal from the memory controlling/voice processing circuit 25. The read/write operations of the voice output address data from/to the DPRAM 24 are simultaneously performed. To avoid the collision of the address from the CPU 23 with that from the memory controlling/voice processing circuit 25, an inverter 30 is connected between the left and right address pins A8 of the DPRAM 24 as shown in FIG. 4. The use of the inverter 30 has the effect of preventing the CPU 23 and the memory controlling/voice processing circuit 25 from simultaneously accessing the same location of the DPRAM 24. In FIG. 4, the left address pins A0–A7 of the DPRAM 24 are connected to the CPU 23 through the address line ADD-L. The right address pins A0–A8 of the DPRAM 24 are connected to the memory controlling/voice processing circuit 25 through the address line ADD-R.

As apparent from the above description, according to the present invention, the total 128 voice service channels are commonly assigned to output the fixed and edited announcement voices. For example, 28 of the total 128 voice service channels may be used to output the edited announcement voice and the remaining 100 channels may be used to output the fixed announcement voice. Therefore, the announcement apparatus of the present invention has the effect of increasing the usefulness of the voice service channels as compared with the conventional one.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An announcement apparatus for a switching system, comprising:

first control means for controlling the output of announcement voices with respect to the total voice service channels;

first storage means for storing voice output address data therein, the voice output address data corresponding to voice output command data from said first control means;

second control means responsive to an interrupt signal, for storing the voice output address data corresponding to the voice output command data from said first control means into said first storage means and outputting voice output state data;

second storage means for transferring the voice output command data from said first control means to said second control means and transferring the voice output state data from said second control means to said first control means;

fixed voice storage means for storing fixed announcement voice data therein and in parallel outputting one of the fixed announcement voice data stored in its location corresponding to an address data from said first storage means;

edited voice storage means for storing edited announcement voice data therein and in parallel outputting one of the edited announcement voice data stored in its location corresponding to an address data from said first storage means; and memory controlling/voice processing means for outputting the interrupt signal to said second control means, reading the voice output address data from said first storage means, outputting the read voice output address data to said fixed voice storage means or said edited voice storage means, converting the parallel announcement voice data from said fixed voice storage means or said edited voice storage means into serial data and transferring the converted serial data to switching means of said switching system through a sub-highway.

2. An announcement apparatus for a switching system, as set forth in claim 1, wherein the voice output command data which is transferred from said first control means to said second control means by said second storage means includes an output command identification flag and a message identification flag.

3. An announcement apparatus for a switching system, as set forth in claim 1, wherein the voice output state data which is transferred from said second control means to said first control means by said second storage means includes an output state identification flag.

4. An announcement apparatus for a switching system, as set forth in claim 2 or claim 3, wherein said second storage means includes:

a first storage area for storing an output command identification flag therein;

a second storage area for storing a message identification flag therein; and a third storage area for storing an output state identification flag therein.

5. An announcement apparatus for a switching system, as set forth in claim 1, wherein said memory controlling/voice processing means outputs the interrupt signal to said second control means every a predetermined time.

6. An announcement apparatus for a switching system, as set forth in claim 1, wherein said second control means, in response to the interrupt signal from said memory controlling/voice processing means, periodically repeats the operation of reading the voice output command data from said second storage means, storing the voice output address data corresponding to the read voice output command data into said first storage means and storing the voice output state data into said second storage means.

7. An announcement apparatus for a switching system, as set forth in claim 1 or claim 5, wherein said memory controlling/voice processing means periodically repeats the operation of reading the voice output address data from said first storage means, outputting the read voice output address data to said fixed voice storage means or said edited voice storage means, converting the parallel announcement voice data from said fixed voice storage means or said edited voice storage means into the serial data and transferring the converted serial data to said switching means of said switching system through said sub-highway.

8. An announcement apparatus for a switching system, as set forth in claim 1, wherein said first storage means has such an addressing structure that said second control means and said memory controlling/voice processing means cannot simultaneously access the same location thereof.

* * * * *